United States Patent [19]
Suzuki et al.

[11] Patent Number: 5,332,367
[45] Date of Patent: Jul. 26, 1994

[54] AUTOMOTIVE AIR CONDITIONING APPARATUS

[75] Inventors: Shigeru Suzuki; Nobuaki Hoshino; Takahisa Ban; Kunifumi Goto, all of Kariya, Japan

[73] Assignee: Kabushiki Kaisha Toyoda Jidoshokki Seisakusho, Kariya, Japan

[21] Appl. No.: 97,876

[22] Filed: Jul. 27, 1993

[30] Foreign Application Priority Data

Aug. 6, 1992 [JP] Japan .................................. 4-210525

[51] Int. Cl.⁵ .............................................. F04B 49/08
[52] U.S. Cl. .................................... 417/286; 62/323.1
[58] Field of Search ................ 417/286, 288; 62/323.1

[56] References Cited

U.S. PATENT DOCUMENTS

| | | | |
|---|---|---|---|
| 2,766,693 | 10/1956 | Wells | 417/286 X |
| 2,832,403 | 4/1958 | Erikson | 417/286 X |
| 4,187,694 | 2/1980 | Midalo | 62/323.1 X |

FOREIGN PATENT DOCUMENTS

2246823 10/1990 Japan .

*Primary Examiner*—Richard E. Gluck
*Attorney, Agent, or Firm*—Brooks Haidt Haffner & Delahunty

[57] ABSTRACT

An automotive air conditioning apparatus includes an input shaft connected to an engine, a pump unit disposed on the input shaft, a compressor unit disposed on the input shaft, and a separator wall disposed between the pump unit and the compressor unit and adapted to seal therebetween in the axial direction of the input shaft. The pump unit includes a first short-circuiting passage communicating the suction space and the discharge space, and the first short-circuiting passage is provided with a first control valve. The compressor unit includes a second short-circuiting passage communicating the suction area and the discharge area, and the second short-circuiting passage is provided with a second control valve. When heating, the first short-circuiting passage is closed with the first control valve, and the second short-circuiting passage is opened with the second control valve to disable the compressor unit. When cooling, the first short-circuiting passage is opened with the first control valve to disable the pump unit, and the second short-circuiting passage is closed with the second control valve.

9 Claims, 7 Drawing Sheets

WHEN HEATING
OR ELECTROMAGNETIC
CLUTCH OFF

Fig. 9 (b)

WHEN COOLING

AUTOMOTIVE AIR CONDITIONING APPARATUS

BACKGROUND OF THE INVENTION

1. Field of the Invention

The present invention relates to an automotive air conditioning apparatus.

2. Description of the Related Art

A conventional general-purpose type automotive heating apparatus is constructed as follows: It supplies high temperature circulating water, which has been used for cooling an engine, to a radiator, thereby cooling the circulating water. At the same time, it also supplies a part of the high temperature circulating water to a heater, and thereby it carries out the heat exchange from the high temperature circulating water to air at the heater. Consequently, it supplies hot air to a passenger room. The circulating water going through the heater is again used for cooling the engine together with the return circulating water from the radiator.

However, this conventional general-purpose type automotive heating apparatus cannot supply the hot air to the passenger room until the circulating water for cooling the engine becomes considerably hot in temperature. Therefore, especially under a relatively low temperature environment in cold areas or the like, it takes a long time to achieve the heating in the passenger room after the engine is started.

Hence, as disclosed in Japanese Unexamined Patent Publication (KOKAI) No. 2-246,823, an automotive heating apparatus has been developed in order to achieve the heating in the passenger room relatively quickly after starting the engine. The automotive heating apparatus comprises a viscous fluid coupling which is connected to an engine cooling circuit.

The viscous fluid coupling of the recently developed automotive heating apparatus includes a housing, an input shaft disposed rotatably in the housing and receiving an engine driving force by way of an electromagnetic clutch, a rotor disposed in the housing, fixed to the input shaft and having a labyrinth groove including a plurality of and a large area of walls, a cover fixed to the housing and having a labyrinth groove engaging with the labyrinth groove of the rotor and disposed away therefrom with predetermined spaces provided therebetween, and a viscous fluid such as a silicone oil or the like sealed between the rotor and the cover. Further, in the viscous fluid coupling, the circulating water is sealed between the cover and the housing, and it is circulated to an engine cooling apparatus.

In the viscous fluid coupling of the recently developed automotive heating apparatus, when the input shaft is rotated in order to rotate the rotor, the viscous fluid sealed between the rotor and the cover is caused to generate heat by the stirring and the shearing resulting from the relative rotation between the rotor and the cover. The heat thus generated is conveyed to the circulating water sealed between the cover and the housing, and thereby heating the circulating water. Finally, the circulating water thus heated is used for the heating in the passenger room through a heater.

On the other hand, there is a compressor used in a conventional general-purpose type automotive cooling apparatus. For example, the compressor is a vane type compressor, and it includes an input shaft to which driving forces resulting from an engine are transmitted by way of an electromagnetic clutch, a cylinder held between side plates so as to form an enclosed area, a rotor disposed in the cylinder and fixed to the input shaft, and a plurality of vanes fitted into the rotor so as to project in the radial directions.

However, the automotive engines have been required to produce high outputs recently, and accordingly the automotive engine rooms have been highly congested. As a result, there have arisen the problems on the on-boardabilities of the various component parts to be accommodated in the engine rooms. When boarding the conventional automotive heating apparatuses and the conventional cooling apparatuses in the automotive engine rooms independently in the conventional manner, they suffer from the limitations in the installation spaces. Thus, it is hard to carry out the installing operation efficiently.

SUMMARY OF THE INVENTION

The present invention has been developed in view of the circumstances described above. It is therefore a primary object of the present invention to integrate a heating apparatus and a cooling apparatus, thereby providing an automotive air conditioning apparatus which contributes to the improvement in the on-boardability of the various component parts in the automotive engine rooms.

An automotive air conditioning apparatus according to the present invention can achieve the aforementioned object, and it comprises:

an input shaft connected to an engine;
a pump unit disposed on the input shaft;
a compressor unit disposed on the input shaft; and
a separator wall disposed between the pump unit and the compressor unit and adapted to seal therebetween in the axial direction of the input shaft;

the pump unit including:
 a first rotary driving member installed to the input shaft and accommodated in an enclosed space formed therein;
 a viscous fluid sealed in the enclosed space;
 a suction space and a discharge space which the viscous fluid is sucked into and discharged out as the first rotary member rotates, and which are communicated with each other by way of a throttle;
 a first short-circuiting passage communicating the suction space and the discharge space; and
 a water jacket disposed outside the enclosed space and adapted to convert heat generated by the viscous fluid into temperature increments of circulating water;

the compressor unit including:
 a second rotary driving member installed to the input shaft and accommodated in an enclosed area formed therein;
 a suction chamber and a discharge chamber which a refrigerant gas is sucked into and discharged out;
 a suction area and a discharge area which are defined in the enclosed area, and which vary volumetrically as the second rotary member rotates, the suction area adapted to suck the refrigerant gas from the suction chamber, the discharge area adapted to compress and discharge the refrigerant gas to the discharge chamber; and
 a second short-circuiting passage communicating the suction chamber and the discharge chamber or the suction area and the discharge area;

the first short-circuiting passage including a first control valve adapted to selectively open and close the first short-circuiting passage;

the second short-circuiting passage including a second control valve adapted to selectively open and close the second short-circuiting passage.

In the present air conditioning apparatus, the pump unit and the compressor unit are disposed in a tandem manner on the single input shaft connected to the engine. Therefore, the present air conditioning apparatus produces many advantageous effects. For instance, it can be boarded on automobiles more efficiently than a heating apparatus (e.g., a pump) and a cooling apparatus (e.g., the compressor) are boarded thereon independently in the conventional manner.

In operation, the present air conditioning apparatus functions as follows. When the heating operation is carried out, the first short-circuiting passage of the pump unit is closed by controlling the first control valve, and at the same time the second short-circuiting passage of the compressor unit is opened by controlling the second control valve. Thus, in the pump unit, the viscous fluid is forcibly transferred from the suction space to the discharge space by the rotation of the first rotary driving member resulting from the rotation of the input shaft. As a result, there arise pressure differences between the suction space and the discharge space. When the discharge space is highly pressurized, the viscous fluid is returned from the discharge space to the suction space of lower pressure by way of the throttle, thereby generating heat. The heat generated by the viscous fluid is converted into the temperature increments of the circulating water. The heated circulating water is used to heat the passenger room through a heater. In the compressor unit, since the second short-circuiting passage is opened, the suction chamber and the discharge chamber or the suction area and the discharge area are short-circuited. As a result, the refrigerating gas is not compressed and discharged by the rotation of the second rotary driving member resulting from the rotation of the input shaft. In other words, the compressor unit does not operate as a compressor.

On the other hand, when the cooling operation is carried out, the first short-circuiting passage of the pump unit is opened by controlling the first control valve, and at the same time the second short-circuiting passage of the compressor unit is closed by controlling the second control valve. Thus, in the pump unit, the suction space and the discharge space are short-circuited, and thereby the pump operation of the pump unit is disabled. To put it differently, there scarcely arise the pressure differences between the suction space and the discharge space, and accordingly the viscous fluid is hardly transferred to generate the heat. In the compressor unit, since the second short-circuiting passage is closed, the refrigerating gas is sucked from the suction chamber to the suction area by the rotation of the second rotary driving member resulting from the rotation of the input shaft, and it is then compressed in the discharge area and discharged out to the discharge chamber. Thus, the compressor unit operates as a compressor normally.

As having been described so far, in the present automotive air conditioning apparatus, the pump unit operating as a heating apparatus and the compressor unit operating as a cooling apparatus are disposed in a tandem manner on the single input shaft. Hence, it is extremely superior in the on-boardability, and also it contributes to the reduction in the overall automotive assembling cost. In addition, according to the present automotive air conditioning apparatus, only one electromagnetic clutch is needed in order to transmit the rotation of the engine to the input shaft. Therefore, it also contributes to the reduction in the number of required component parts and eventually in the component parts cost.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIG. 9 (a) is a schematic block diagram of yet another modified version of the First Preferred Embodiment when heating is carried out or an electromagnetic clutch is turned off; and FIG. 9 (b) is a schematic block diagram of the yet another modified version of the First Preferred Embodiment when cooling is carried out.

DETAILED DESCRIPTION OF THE PREFERRED EMBODIMENTS

Having generally described the present invention, a further understanding can be obtained by reference to the specific preferred embodiment which is provided herein for purposes of illustration only and is not intended to limit the scope of the appended claims.

FIRST PREFERRED EMBODIMENT

Figure 1:
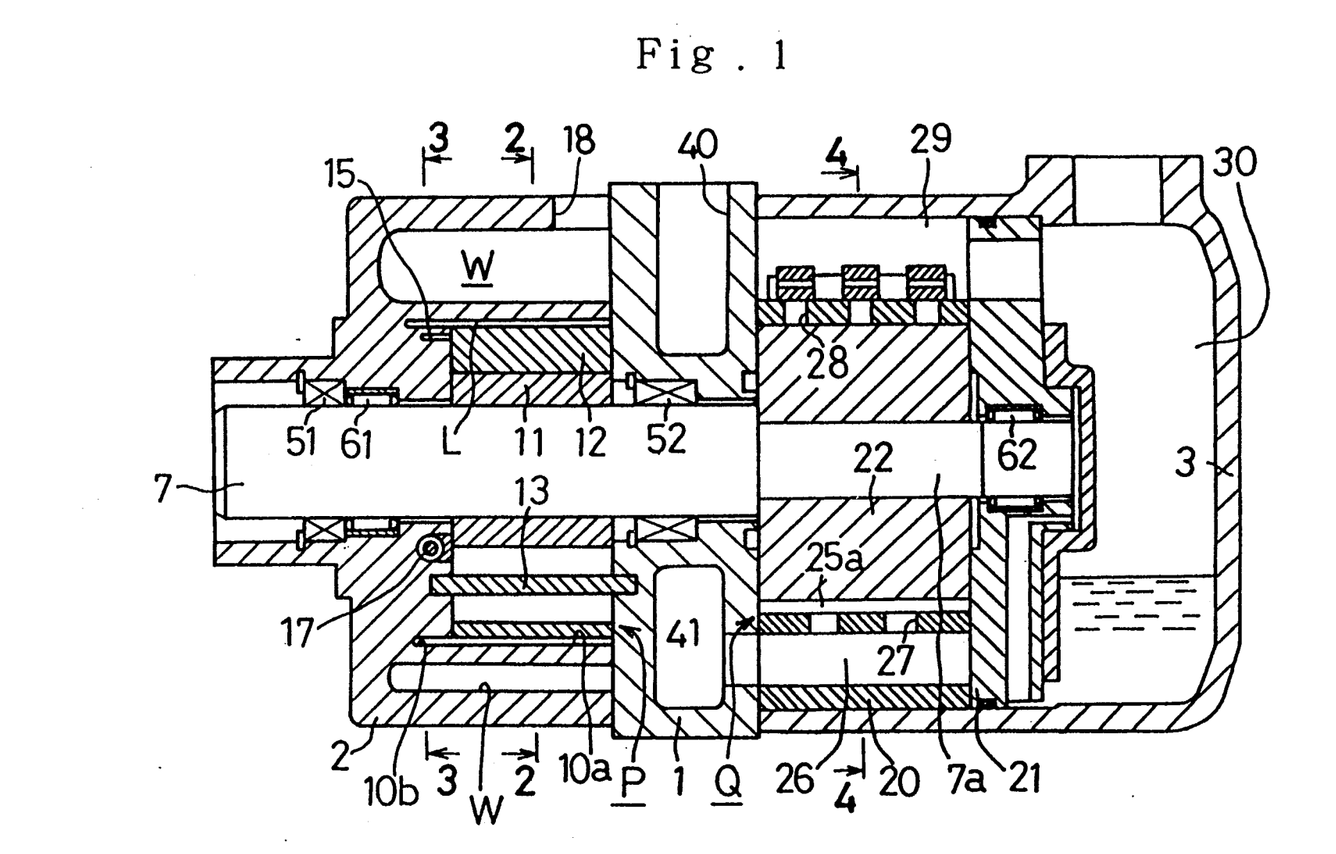
FIG. 1 is a longitudinal cross-sectional view of a First Preferred Embodiment of an automotive air conditioning apparatus according to the present invention.
Figure 3:
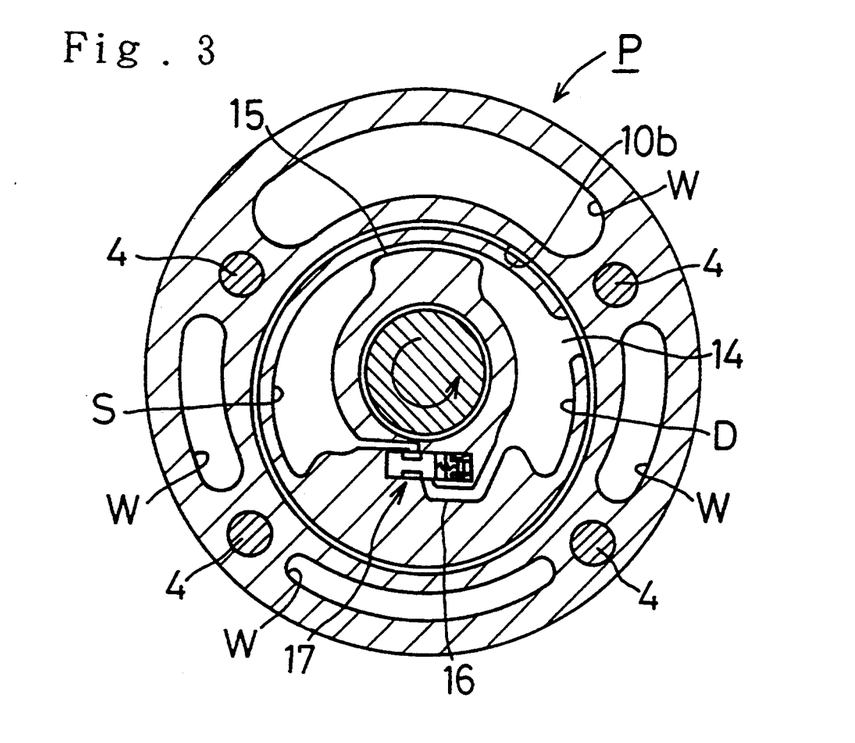
FIG. 3 is a lateral cross-sectional view of the First Preferred Embodiment of the present automotive air conditioning apparatus taken along line "3"—"3" of FIG. 1.
Figure 4:
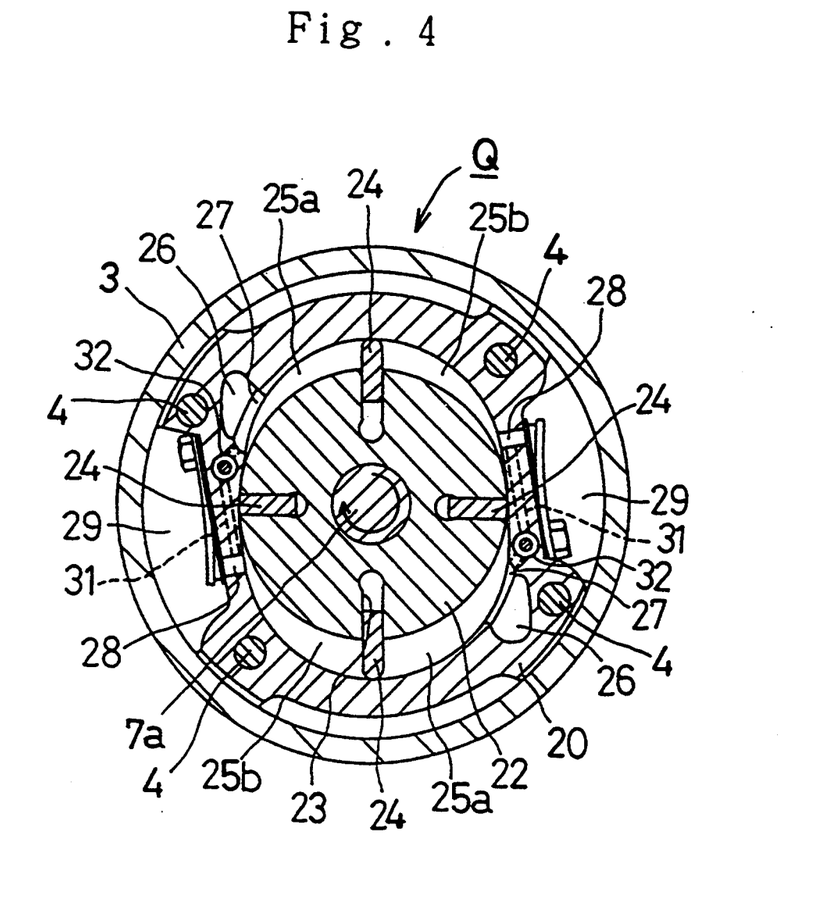
FIG. 4 is a lateral cross-sectional view of the First Preferred Embodiment of the present automotive air conditioning apparatus taken along line "4"—"4" of FIG. 1.

As illustrated in FIG. 1, in the First Preferred Embodiment of the present air conditioning apparatus, a separator wall 1 is connected to a front housing 2 at the front end (i.e., the left-hand side in FIG. 1) with bolts 4 (not shown in FIG. 1, but shown in FIGS. 2 and 3), and it is also connected to a rear housing 3 at the rear end (i.e., the right-hand side in FIG. 1) with bolts 4 (not shown in FIG. 1, but shown in FIG. 4). In the front housing 2, there is disposed an internal gear pump unit "P." In the rear housing 3, there is disposed a vane-type compressor unit "Q."

Figure 2:
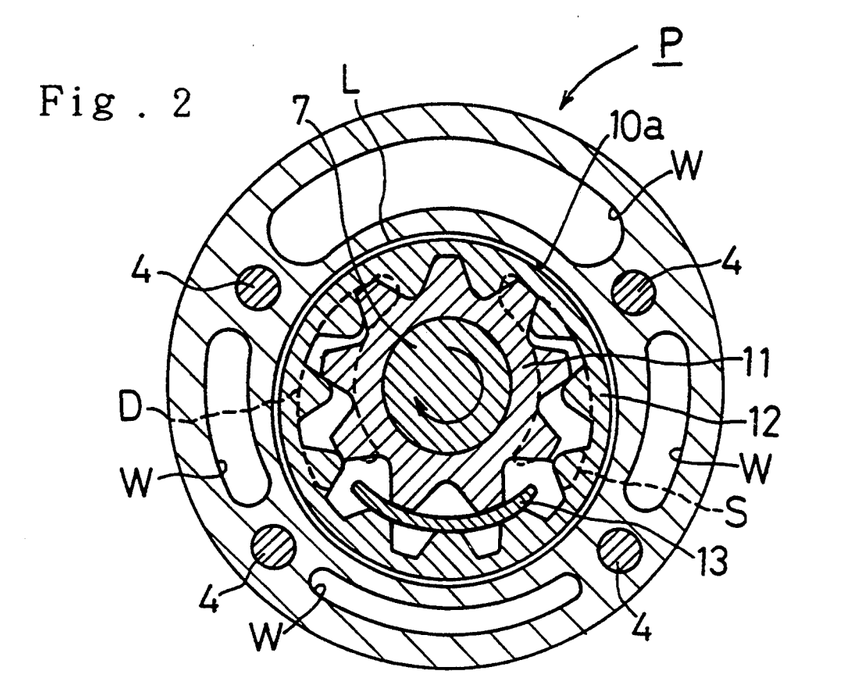
FIG. 2 is a lateral cross-sectional view of the First Preferred Embodiment of the present automotive air conditioning apparatus taken along line "2"—"2" of FIG. 1.

As illustrated in FIG. 2, in the front housing 2, there are formed a cylinder-shaped enclosed space 10a. Also, as illustrated in FIG. 3, there is formed an annular enclosed space 10b which is constructed coaxially with the enclosed space 10a and which has an outer peripheral surface being flush therewith.

Turning back to FIG. 1, a shaft hole is drilled through, and it is disposed eccentrically with respect to the axial center of the enclosed space 10a of the front housing 2. An input shaft 7 is disposed rotatably in the shaft hole by way of shaft sealing devices 51, 52 and a bearing 61. The input shaft 7 is connected to an engine (not shown) at the leading end (i.e., the left-hand side in FIG. 1) by way of an electromagnetic clutch (not shown), and it is fixed to a driving external gear 11 (i.e., the first rotary driving member according to the present invention) in the enclosed space 10a. Further, the input shaft 7 is disposed rotatably in a shaft hole at the trailing end (i.e., the right-hand side in FIG. 1) by way of a bearing 62. The shaft hole is drilled through in a side plate 21 described later.

As best shown in FIG. 2, a driven internal gear 12, which meshes with the driving external gear 11, is disposed rotatably in the enclosed space 10a so as to provide a predetermined annular clearance "L" between itself and the peripheral wall of the enclosed space 10a. A parting plate 13 is interposed in the non-meshing area between the driving external gear 11 and the driven internal gear 12. Further, as illustrated in FIG. 1, the parting plate 13 is supported with the separator wall 1 and the front housing 2 at the axial ends.

As illustrated in FIG. 3, in the front housing 2, there are formed a suction space "S" and a discharge space "D" in the front housing 2 outside and axially opposite to the meshing area between the driving external gear 11 and the driven internal gear 12. The discharge space "D" is communicated with the enclosed space 10b through a communication passage 14.

Further, as also illustrated in FIG. 3, there is formed a return passage 15 (i.e., the throttle according to the present invention) communicating between the discharge space "D" and the suction space "S" in the front housing 2. Furthermore, there is also formed a first short-circuiting passage 16 communicating between the discharge space "D" and the suction space "S" in the front housing 2, and it is provided with a first control valve 17 which is controlled with an electromagnet and which is adapted to open and close the first short-circuiting passage 16. The inside diameter of the first short-circuiting passage 16 is set so that it is fairly larger than that of the return passage 15. Moreover, an oil is filled between the driving external gear 11 and the driven internal gear 12, between the driving external gear 11 and the parting plate 13, between the parting plate 13 and the driven internal gear 12, and as well as in the suction space "S", in the discharge space "D" and in the annular clearance "L."

Turning back now to FIG. 1, there is formed a suction port 18 in the front housing 2. As best shown in FIGS. 2 and 3, outside the enclosed spaces 10a and 10b in the front housing 2, there are also formed a plurality of water jackets "W" connected to a discharge port (not shown) and communicating with each other. These water jackets "W" are connected with a heater (not shown) by way of a water pump (not shown) so as to circulate circulating water.

Turning now to FIG. 4, in the rear housing 3, there is accommodated and fixed a virtually barrel-shaped cylinder 20. The cylinder 20 is closed with the separator wall 1 and a side plate 20 at the opening ends as illustrated in FIG. 1, and thereby a virtually ellipse-shaped cylinder chamber is formed therein. In the cylinder chamber, a column-shaped rotor 22 (i.e., the second rotary driving member according to the present invention) is disposed rotatably therein, and it is fixed to a trailing end of the input shaft 7a of the input shaft 7 as illustrated in FIG. 1. As best shown in FIG. 4, four vane grooves 23 are machined at rotary symmetrical positions around the outer peripheral portion of the rotor 22. In the vane grooves 23, four vanes 24 are disposed projectably in the radial directions. The outer peripheral surface of the rotor 22 is engaged with the minor-axis-side inner peripheral surfaces of the virtually ellipse-shaped cylinder chamber so as to provide predetermined spaces but in a sealing manner, and thereby there is formed four enclosed areas which are surrounded by the neighboring two vanes 24, 24, the outer peripheral surface of the rotor 22, the inner peripheral surfaces of the cylinder 20, the inner surface of the separator wall 1 and the inner surface of the side plate 21. In particular, two of the enclosed spaces are adapted to be suction areas 25a, 25a, and the other two are adapted to be discharge areas 25b, 25b. The suction areas 25a, 25a of low pressure ambiences are disposed in front of the engagements between the outer peripheral surface of the rotor 22 and the minor-axis-side inner peripheral surfaces of the cylinder chamber in the rotary direction of the rotor 22 (e.g., in the clockwise direction). The discharge areas 25b, 25b of high pressure ambiences are disposed in rear of the engagements between the outer peripheral surface of the rotor 22 and the minor-axis-side inner peripheral surfaces of the cylinder chamber in the rotary direction of the rotor 22.

Turning back to FIG. 1, in the separator wall 1, there is formed a suction chamber 41 which is connected to an suction port 40. The suction chamber 41 is communicated with the suction areas 25a by way of suction passages 26 and suction openings 27 which are disposed at predetermined positions in the circumferential direction of the cylinder 20. On the other hand, the discharge areas 25b are communicated with discharge chambers 29 by way of discharge openings 28 which are disposed at another predetermined positions in the circumferential direction of the cylinder 20. The discharge chambers 29 are communicated with an oil separator chamber 30, which is formed between the side plate 21 and the rear housing 3, by way of communication holes (not shown). Further, as illustrated in FIG. 4, there are formed two second short-circuiting passages 31, 31 which communicate between the suction openings 27 and the discharge openings 28. As earlier described, the suction openings 27 and the discharge openings 28 are respectively communicated with the suction areas 25a and the discharge areas 25b which are neighboring each other with respect to the engagement between the cylinder chamber and the rotor 22. The second short-circuiting passages 31, 31 are provided with a second control valve 32 which is controlled with an electromagnet in a manner similar to the first control valve 17.

In the thus constructed First Preferred Embodiment of the present automotive air conditioning apparatus, the rotation of the engine is transmitted to the input shaft 7 by turning on the electromagnetic clutch. When the heating operation is carried out, the first short-circuiting passage 16 is closed by controlling the control valve 17, and at the same time the second short-circuiting passages 31 are opened by controlling the second control valves 32. Thus, the pump unit "P" operates normally, and the compressor unit "Q" does not operate at all.

Specifically speaking, when the rotation of the engine is transmitted to the input shaft, the driving external gear 11 and the driven internal gear 12 are rotated as can be understood from FIGS. 2 and 3. Accordingly, as can be appreciated from FIG. 3, the driving external gear 11 and the driven internal gear 12 forcibly transfers the oil from the suction space "S" to the discharge space "D," and there arise pressure differences in the oil between the suction space "S" and the discharge space "D." As a result, the oil highly pressurized in the discharge space "D" is returned from the discharge space "D" to the depressurized suction space "S" by way of the return passage 15 (shown in FIG. 3). Namely, the oil is highly pressurized, its internal energy is increased thereby, and it generates heat through the shearing when it moves in the narrow return passage 15. Further, the oil also generates heat when it is stirred and sheared between the driving external gear 11 and the parting plate 13, and between the parting plate 13 and the driven internal gear 12. Furthermore, the oil in the annular clearance "L" is also highly pressurized by way of the communication passage 14 (shown in FIG. 3) because the discharge space "D" is highly pressurized, and accordingly the oil is sheared while its internal energy is increased by the high pressurizing. During the shearing, the oil is sheared uniformly because the annular clearance "L" surrounds the outer periphery of the driven internal gear 12 uniformly. All in all, the oil generates heat effectively and uniformly. The heat thus generated by the oil is converted into the temperature increments of the circulating water in the water jackets "W" by way of the front housing 2. The circulating water thus heated is used to heat the passenger room through a heater.

Figure 6:
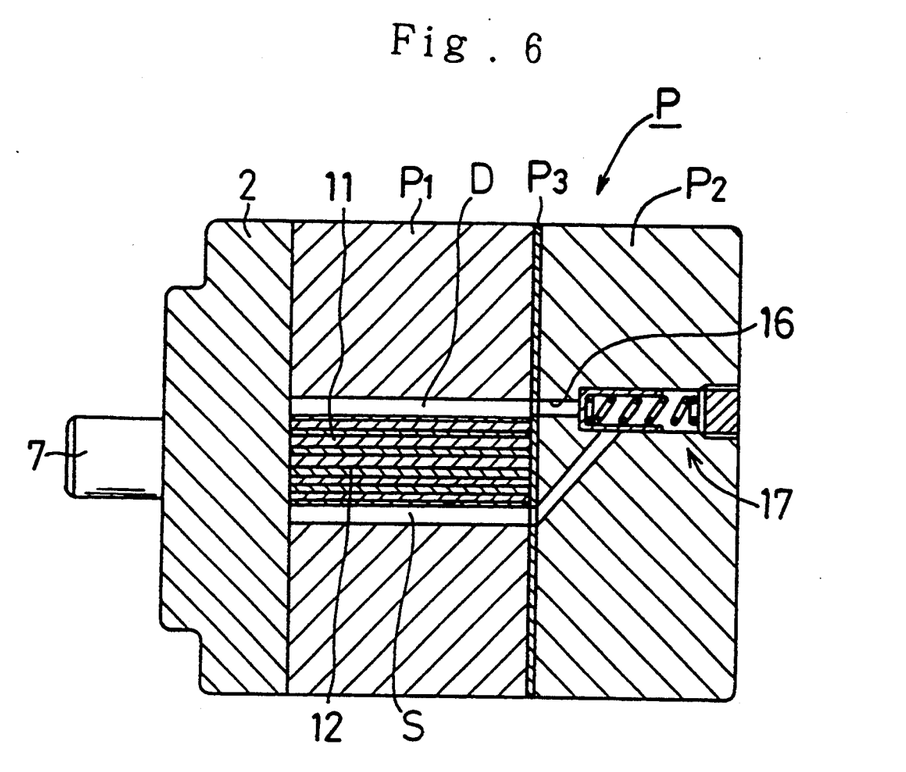
FIG. 6 is a longitudinal cross-sectional view of the modified version of the First Preferred Embodiment taken along line "6"—"6" of FIG. 5.

In addition, a relief valve means as illustrated in FIG. 6 can substitute the first control valve 17. For instance, such a relief valve means is used to regulate the upper limit of the pressure in the discharge space "D," and accordingly it is adapted to communicate the discharge space "D" and the suction space "S" when the pressure differences between the spaces exceed a predetermined value.

In the compressor unit "Q," since the two second short-circuiting passages 31 short-circuiting between the suction areas 25a and the discharge areas 25b are opened. As a result, even when the rotor 22 is rotated by the rotation of the input shaft 7, the refrigerating gas is not compressed in and discharged out of the discharge areas 25b, and consequently the compressor unit "Q" does not operate as a compressor.

On the other hand, when the cooling operation is carried out, the first short-circuiting passage 16 is opened by controlling the control valve 17, and at the same time the two second short-circuiting passages 31 are closed by controlling the control valves 32. Thus, the pump unit "P" does not operate at all, and the compressor unit "Q" operates as a compressor normally.

Specifically speaking, in the pump unit "P," there scarcely arise the pressure differences between the suction space "S" and the discharge space "D" even when the rotation of the engine is transmitted to the input shaft 7 to rotate the driving external gear 11 and the driven internal gear 12. As a result, the oil is hardly transmitted to generate the heat.

In the compressor unit "Q," as can be appreciated from FIG. 4, the suction areas 25a increase the volume in accordance with the rotation of the input shaft 7, and the discharge areas 25b decrease the volume in accordance therewith. Accordingly, the refrigerant gas is sucked into the suction areas 25a from the suction chambers 41 by way of the suction passages 26 and the suction openings 27, and it is compressed in and discharged out of the discharge spaces 25b to the discharge chambers 29 by way of the discharge openings 28.

As having been described so far, in the First Preferred Embodiment of the present automotive air conditioning apparatus, the pump unit "P" operating as a heating apparatus and the compressor unit "Q" operating as a cooling apparatus are disposed in a tandem manner on the single input shaft 7. Hence, it is extremely superior in the on-boardability, and also it contributes to the reduction in the overall automotive assembling cost. In addition, according to the present automotive air conditioning apparatus, only one electromagnetic clutch is needed in order to transmit the rotation of the engine to the input shaft 7. Therefore, it also contributes to the reduction in the number of required component parts and eventually in the component parts cost.

MODIFIED VERSIONS OF FIRST PREFERRED EMBODIMENT

Figure 5:
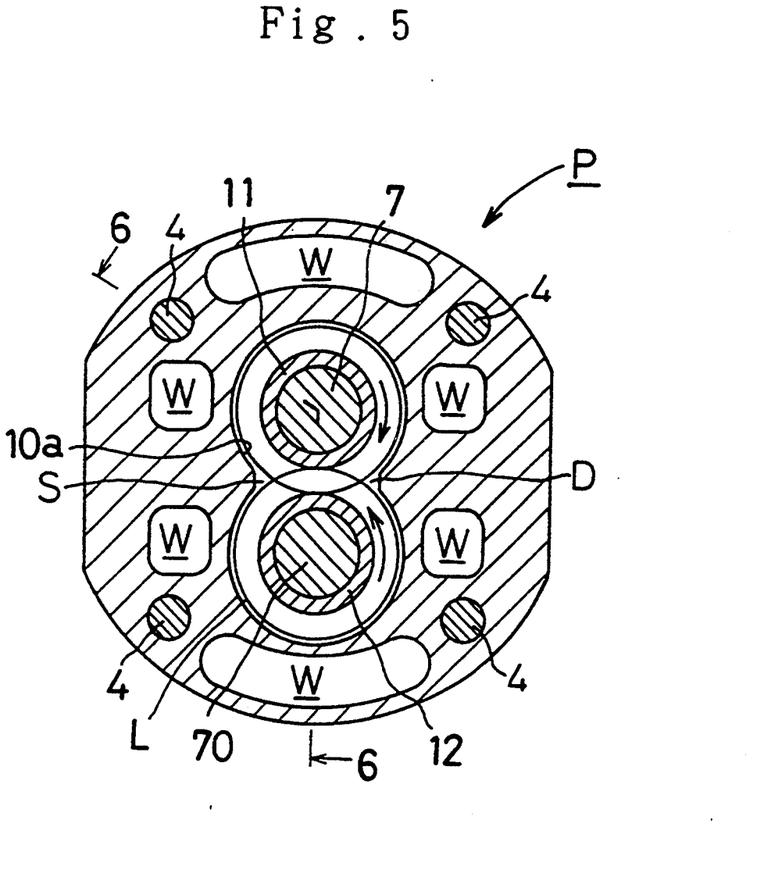
FIG. 5 is a lateral cross-sectional view of a modified version of the First Preferred Embodiment.

In the First Preferred Embodiment of the present automotive air conditioning apparatus, the pump unit "P" is constructed with the internal gear type pump means. The pump unit "P" can be constructed with an external gear type pump means as illustrated in FIGS. 5 and 6. Hereinafter, the like component parts are designated at like numbers. As best shown in FIG. 5, such a pump unit "P" includes a driving external gear 11 disposed in an enclosed space 10a and installed to the input shaft 7, and a driven external gear 12 meshing with the driving external gear 11 and installed to a driven shaft 70 disposed in the enclosed space 10a. As illustrated in FIG. 6, the pump unit "P" is divided into the front half "P₁" and the rear half "P₂". The enclosed space 10a is formed in the front half "P₁," the first short-circuiting passage 16 is formed in the rear half "P₂," and the front half "P₁" and the rear half "P₂" are connected by way of a gasket "P₃." In particular, as illustrated in FIG. 6, the discharge space "D" and the suction space "S" are communicated with each other by the first short-circuiting passage 16 including a relief valve 17. The relief valve 17 is adapted to communicate the discharge space "D" and the suction space "S" when the pressure differences between the spaces exceed a predetermined value.

Figure 7:
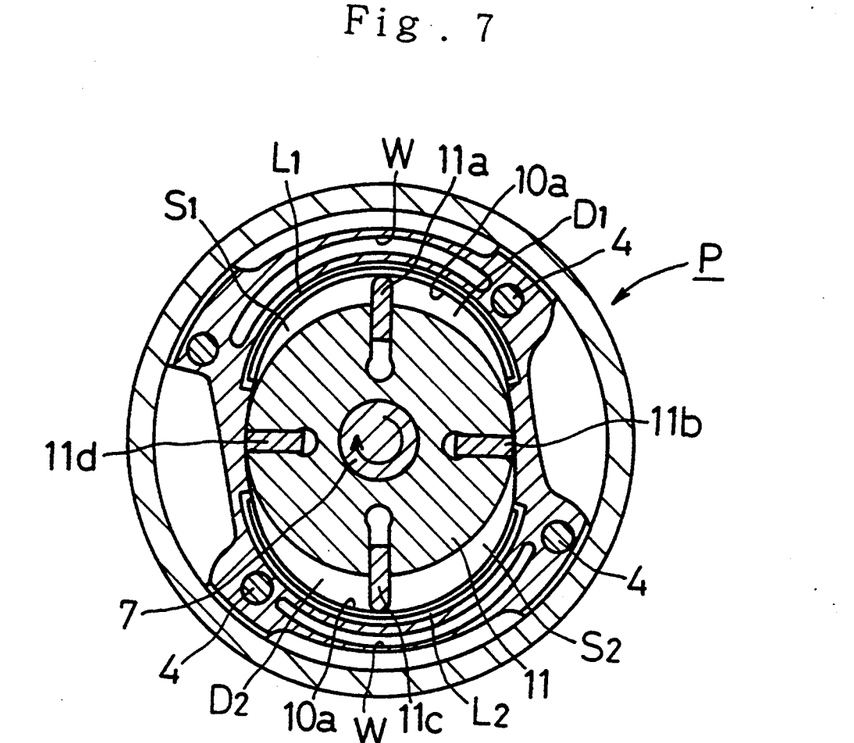
FIG. 7 is a lateral cross-sectional view of another modified version of the First Preferred Embodiment.

Furthermore, the pump unit "P" can be constructed with a vane type pump means as illustrated in FIG. 7. Such a pump unit "Q" includes a rotor 11 disposed in an enclosed space 10a and installed to the input shaft 7, and four vanes 11a through 11d fitted into the rotor 11 so as to project in the radial directions. In particular, in the pump unit "Q," there are formed a discharge space "D₁" and a suction space "S₁" disposed on opposite sides with respect to the vane 11a, and a clearance "L₁" communicates therebetween. There are also formed a discharge space "D₂" and a suction space "S₂" disposed on opposite sides with respect to the vane 11c, and a clearance "L₂" communicates therebetween.

Figure 8:
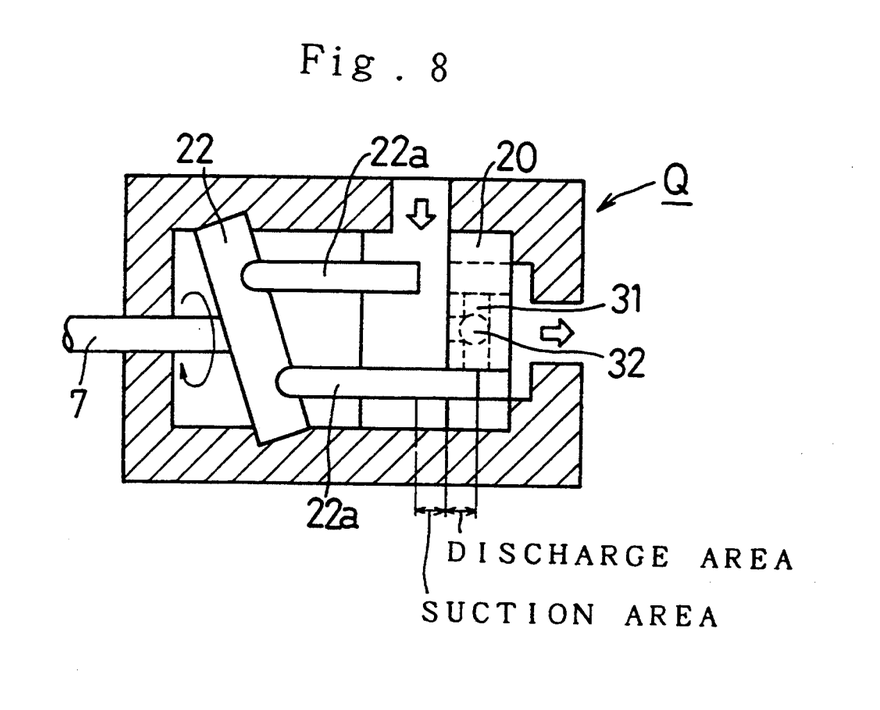
FIG. 8 is a schematic cross-sectional view of still another modified version of the First Preferred Embodiment.

Moreover, the compressor unit "Q" can be constructed with a piston type compressor means as illustrated in FIG. 8. Such a compressor unit "Q" includes a swash plate 22 disposed in an enclosed area and installed to the input shaft 7, a plurality of pistons 22a disposed on the swash plate 22, and a cylinder block 20 provided with a plurality of cylinder bores into which the pistons 21 go in and go out reciprocally.

Figure 9A:
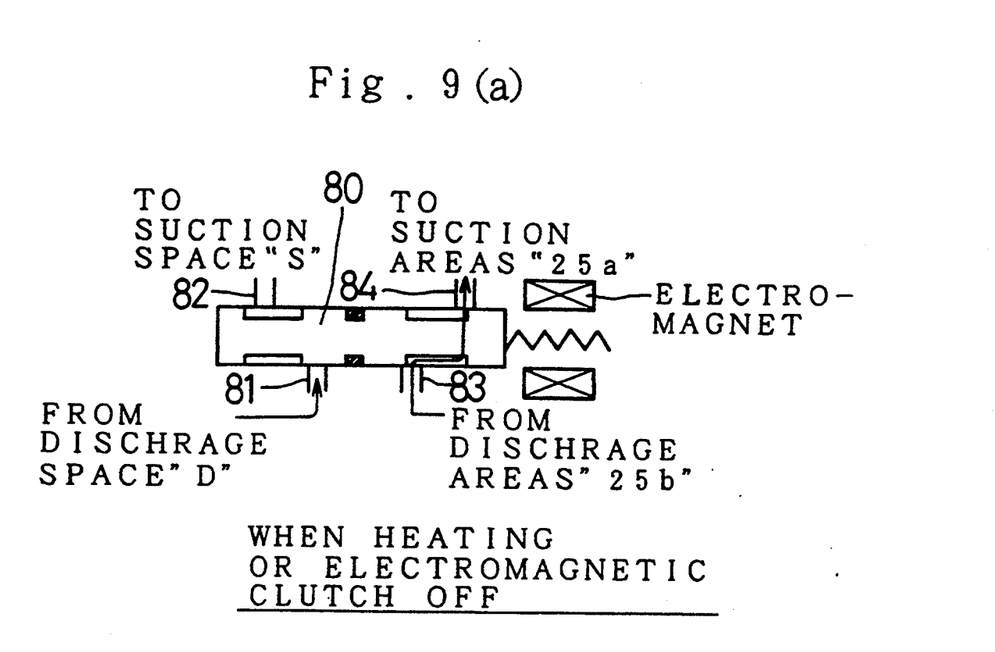
Figure 9B:
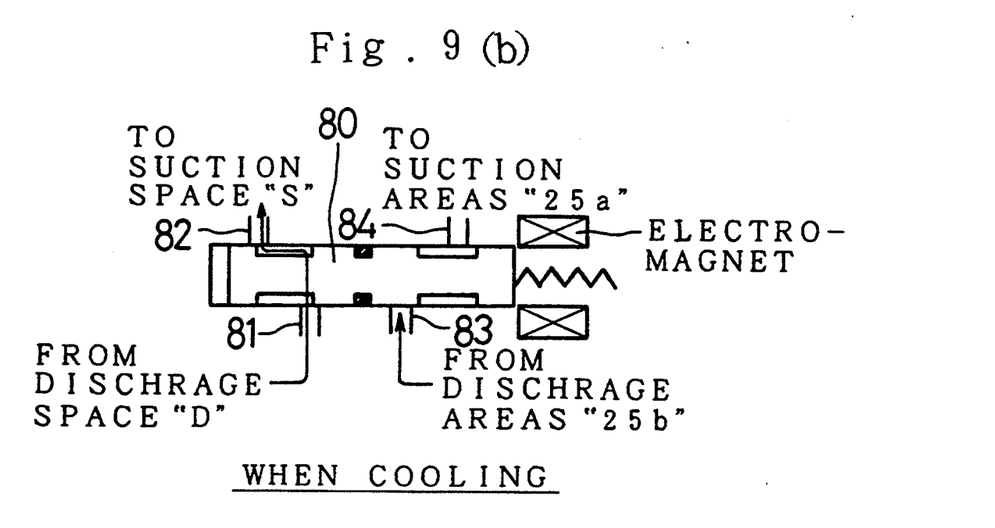

In addition, it is possible to integrate the first control valve 17 disposed in and adapted to open and close the first short-circuiting passage 16 of the pump unit "P" with the second control valves 32 disposed in and adapted to open and close the second short-circuiting passages 31 of the compressor unit "Q" as illustrated in FIGS. 9 (a) and (b). Such an integrated valve can be a slide type valve means disposed midway in the first and second short-circuiting passages 16 and 32. For instance, it includes a spool 80 actuated reciprocally with an electromagnet, a first inlet port 81 communicated with the discharge space "D" of the pump unit "P," a first outlet port 82 communicated with the suction space "S" of the pump unit "P," a second inlet port 83 communicated with the discharge areas "25b" of the compressor unit "Q," and a second outlet port 84 communicated with the suction areas "25a" of the compressor unit "Q." When the heating is carried out or the electromagnetic clutch is turned off, the spool 80 is positioned at the original position, and thereby it shuts off the first inlet port 81 and the first outlet port 82 but it communicates the second inlet port 83 and the second outlet port 84. On the other hand, when the cooling is carried out, the spool 80 is actuated rearwards (i.e., in the right direction in the drawing), and thereby it communicates the first inlet port 81 and the first outlet port 82 but it shuts off the second inlet port 83 and the second outlet port 84.

Having now fully described the present invention, it will be apparent to one of ordinary skill in the art that many changes and modifications can be made thereto without departing from the spirit or scope of the present invention as set forth herein including the appended claims.

What is claimed is:

1. An automotive air conditioning apparatus, comprising:
   an input shaft for coupling to an engine;
   a pump unit disposed on said input shaft;
   a compressor unit disposed on said input shaft; and
   a separator wall disposed between said pump unit and said compressor unit and adapted to seal therebetween in the axial direction of said input shaft;
   said pump unit including:
      a first rotary driving member installed to said input shaft and accommodated in an enclosed space formed therein;
      a viscous fluid sealed in said enclosed space;
      a suction space and a discharge space which said viscous fluid is sucked into and discharged out as said first rotary member rotates, and which are communicated with each other by way of a throttle;
      a first short-circuiting passage communicating said suction space and said discharge space; and
      a water jacket disposed outside said enclosed space and adapted to convert heat generated by said viscous fluid into temperature increments of circulating water;
   said compressor unit including:
      a second rotary driving member installed to said input shaft and accommodated in an enclosed area formed therein;
      a suction chamber and a discharge chamber which a refrigerant gas is sucked into and discharged out from;
      a suction area and a discharge area which are defined in said enclosed area, and which vary volumetrically as said second rotary member rotates, the suction area adapted to suck said refrigerant gas from said suction chamber, the discharge area adapted to compress and discharge said refrigerant gas to said discharge chamber; and
      a second short-circuiting passage communicating said suction chamber and said discharge chamber or said suction area and said discharge area;
      said first short-circuiting passage including a first control valve adapted to selectively open and close said first short-circuiting passage;
      said second short-circuiting passage including a second control valve adapted to selectively open and close said second short-circuiting passage.

2. The automotive air conditioning apparatus according to claim 1, wherein said pump unit further includes a driven member adapted to be driven with said first rotary driving member.

3. The automotive air conditioning apparatus according to claim 1, wherein said first short-circuiting passage has an inside diameter larger than that of said throttle.

4. The automotive air conditioning apparatus according to claim 1, wherein said first control valve is constructed with a relief valve means which is adapted to communicate said discharge space and said suction space when the pressure differences between said spaces exceed a predetermined value.

5. The automotive air conditioning apparatus according to claim 1, wherein said pump unit is constructed with an internal gear pump means which includes a driving external gear installed to said input shaft, a driven internal gear disposed rotatably with a predetermined clearance provided therearound in said enclosed space and meshing with the driving external gear, and s parting plate interposed in the non-meshing area between the driving external gear and the driven internal gear.

6. The automotive air conditioning apparatus according to claim 1, wherein said pump unit is constructed with an external gear pump means which includes a driving external gear installed to said input shaft and provided with a predetermined clearance therearound, and a driven external gear installed to a driven shaft disposed in said enclosed Space, meshing with the driving external gear and provided with a predetermined space therearound.

7. The automotive air conditioning apparatus according to claim 1, wherein said pump unit is constructed with a vane type pump means which includes a rotor disposed in said enclosed space and installed to said input shaft, and a plurality of vanes fitted into the rotor so as to project in the radial directions.

8. The automotive air conditioning apparatus according to claim 1, wherein said compressor unit is constructed with a piston type compressor means which includes a swash plate disposed in said enclosed area and installed to said input shaft, a plurality of pistons disposed on the swash plate, and a cylinder block provided with a plurality of cylinder bores into which the pistons go in and go out reciprocally.

9. The automotive air conditioning apparatus according to claim 1, wherein said first control valve and said second control valve are integrated with a slide type valve means which is disposed midway in said first and second short-circuiting passages and includes a spool actuated reciprocally with an electromagnet, a first inlet port communicated with said discharge space of said pump unit, a first outlet port communicated with said suction space of said pump unit, a second inlet port communicated with said discharge area of said compressor unit, and a second outlet port communicated with said suction area of said compressor unit, the spool adapted to shut off the first inlet port and the first outlet port but to communicate the second inlet port and the second outlet port when heating is carried out, and the spool further adapted to communicate the first inlet port and the first outlet port but to shut off the second inlet port and the second outlet port when cooling is carried out.

* * * * *

UNITED STATES PATENT AND TRADEMARK OFFICE
CERTIFICATE OF CORRECTION

PATENT NO. : 5,332,367
DATED      : July 26, 1994
INVENTOR(S) : S. Suzuki et al

It is certified that error appears in the above-indentified patent and that said Letters Patent is hereby corrected as shown below:

Column 10, line 44, after "and" (second occurrence) change "s" to --a--; line 54, "Space," should read --space,--.

Signed and Sealed this

Seventeenth Day of January, 1995

Attest:

BRUCE LEHMAN

*Attesting Officer*        *Commissioner of Patents and Trademarks*